United States Patent Office 3,737,429
Patented June 5, 1973

---

3,737,429
PREPARATION OF 4,5,6,7-TETRAHYDROCYCLO-PENTA-1,3-DIOXINONES-(4)
Gerhard Jager, Wuppertal-Vohwinkel, and Richard Wegler, Leverkusen, Germany, assignors to Bayer Aktiengesellschaft, Leverkusen, Germany
No Drawing. Filed Oct. 19, 1970, Ser. No. 82,136
Claims priority, application Germany, Nov. 14, 1969,
P 19 57 312.7
Int. Cl. C07d *15/00*
U.S. Cl. 260—240 D                                7 Claims

---

ABSTRACT OF THE DISCLOSURE

Preparing 4,5,6,7-tetrahydrocyclopenta-1,3-dioxinones-(4), some of which are new, by reacting an adipic acid dihalide having two hydrogen atoms on one α-carbon atom with an aldehyde or ketone in the presence of a tertiary amine as acid binder. The compounds are useful as intermediates in the preparation of fungicides.

---

The present invention relates to and has for its object the provision of new methods of producing 4,5,6,7-tetrahydrocyclopenta-1,3-dioxinones-(4), some of which are new, which dioxinones are useful as intermediates in the preparation of fungicides. The methods involve a simple reaction, using readily available starting materials and resulting in outstanding yields and purity, with other and further objects of the invention becoming apparent from a study of the within specification and accompanying examples.

It is known (cf. Chemische Berichte, volume 98, pp. 2099–2102 (1965)) that 4,5,6,7-tetrahydrocyclopenta-1,3-dioxinones-(4) substituted in 2-position are obtained when solutions of 2-diazodihydroresorcinol in xylene are added dropwise to solutions of aldehydes in xylene which also contain mercury (II) chloride and which are preheated to 130 to 140° C.

The known process, however, exhibits a number of disadvantages. Thus, the preparation of the diazo compound required for thermolysis is very expensive. Moreover, the reactions proceed only in the presence of mercury salts and require high temperatures, which excludes a synthesis by this method of thermolabile tetrahydrocyclopenta-1,3-dioxinones-(4).

The present invention provides a process for the production of 4,5,6,7-tetrahydrocyclopenta-1,3-dioxinones-(4) by reacting an adipic acid dihalide having two hydrogen atoms on one α-carbon atom, i.e. unsubstituted in at least one α-position, with an aldehyde or ketone in the presence of a tertiary amine as acid binder.

Expressed graphically the invention in a preferred embodiment provides a process for the production of a 4,5,6,7-tetrahydrocyclopenta-1,3-dioxinone-(4) of the general formula $$\begin{array}{c} R^3 \quad R^2 \quad O \\ \diagup \diagdown \diagup \diagdown \\ R^4 \quad \quad \quad O \\ | \quad \quad \quad \quad \diagdown R^1 \\ R^5 \quad \quad \quad \diagup \\ \diagdown \diagup \diagdown O \diagup R \\ R^6 \quad R^7 \end{array} \quad \text{(I)}$$

in which

R and $R^1$ jointly stand for alkylene, or
R and $R^1$ each independently (of each other) stands for hydrogen, alkyl, haloalkyl, alkenyl, aralkyl or aralkenyl with, in each case, up to 6 carbon atoms in the alkyl or alkenyl, or for cycloalkyl with 5 or 6 carbon atoms, or for aryl which may be substituted by lower alkyl, lower alkoxy, lower alkylmercapto, lower alkyl-sulfoxy, lower alkylsulfonyl, amino, nitro, halogen or cyano, or for a heterocyclic radical; and
$R^2$ to $R^7$ each independently (of one another) stands for hydrogen or alkyl with up to 6 carbon atom, in which a dicarboxylic acid dihalide of the general formula $$\begin{array}{c} O \quad \quad R^2 \; R^4 \; R^6 \quad O \\ \| \quad \quad | \quad | \quad | \quad \| \\ X-C-CH_2-C-C-C-C-X \\ \quad \quad \quad | \quad | \quad | \\ \quad \quad \quad R^3 \; R^5 \; R^7 \end{array} \quad \text{(II)}$$

in which $R^2$ to $R^7$ have the meanings stated above, and
X stands for chlorine or bromine, is reacted with an aldehyde or ketone of the general formula $$O=C\diagup^{R^1}_{\diagdown R} \quad \text{(III)}$$

in which

R and $R^1$ have the meanings stated above, in an inert organic solvent at a temperature from between about −20° to +80° C., and in the presence of a tertiary amine as acid-binder.

It is very surprising that, according to the process of the invention, the bicyclic tetrahydrocyclopenta-1,3-dioxinones-(4) are obtained in good yields and high purity in a one-step reaction from the two open-chain reaction components.

The process according to the invention exhibits great advantages compared with the diazo-ketone method. The compounds of the general Formula I can be prepared from readily accessible starting materials and under mild reaction conditions in good yields and great purity. The relatively low reaction temperatures are particularly advantageous for the preparation of the thermally labile 2-alkyl- or 2,2-dialkyl-4,5,6,7-tetrahydrocyclopenta-1,3-dioxinones-(4), which cannot be prepared satisfactorily according to the known method mentioned above.

When adipic acid dichloride and acetone are used as starting materials, and triethylamine as acid-binder, the reaction course can be represented by the following formula scheme:

$$\begin{array}{c} O \quad\quad\quad O \quad\quad\quad\quad CH_3 \\ \| \quad\quad\quad\quad \| \quad\quad\quad\quad \diagup \\ Cl-C-(CH_2)_4-C-Cl + O=C \quad\quad + 2N(C_2H_5)_3 \longrightarrow \\ \quad\quad\quad\quad\quad\quad\quad\quad\quad\quad\quad\quad \diagdown CH_3 \end{array}$$

(IIa)                         (IIIa)

$$\begin{array}{c} O \\ \| \\ \diagup\diagdown \\ | \quad\quad O \\ | \quad\quad \diagdown C-CH_3 \quad + 2[(C_2H_5)_3NH]^{(+)}Cl^{(-)} \\ \diagdown\diagup O \diagup \diagdown CH_3 \end{array}$$

(1)

The dicarboxylic acid dihalides to be used according to the invention as starting materials are defined by the general Formula II. The compounds are known and can be prepared in known manner, for example by reaction of dicarboxylic acids with thionyl chloride.

$R^2$ to $R^7$ stand preferably for hydrogen or for lower alkyl, especially with 1 to 3 carbon atoms.

As examples of the dicarboxylic acid halides which can be used according to the invention, there are mentioned in particular: adipic acid dichloride, 2,2-dimethyl-adipic acid dichloride, 2,2,4-trimethyladipic acid dichloride, and the like.

The aldehydes or ketones to be used according to the invention as starting materials are defined by the general Formula III. Preferably, R and R¹ jointly stand for pentamethylene, or independently stand for alkyl, haloalkyl or alkenyl with up to 4 carbon atoms, for phenylmethyl or phenylethenyl, for phenyl (optionally substituted by methyl, isopropyl, methoxy, ethoxy, methylmercapto, methylsulfoxy, methylsulfonyl, nitro, fluorine or chlorine), or for furyl, and the like.

The aldehydes and ketones to be used as starting materials are known and can be obtained according to generally known preparative instructions.

As examples of the aldehydes and ketones which can be used according to the invention, there are mentioned in particular: formaldehyde, acetaldehyde, chloroacetaldehyde, trichloroacetaldehyde; propionaldehyde, butyraldehyde, acrolein, benzaldehyde, 4-methylbenzaldehyde, 4-fluorobenzaldehyde, 4-cholorbenzaldehyde, 2-methylbenzaldehyde, 2 - chlorobenzaldehyde, 4 - nitrobenzaldehyde, anicaldehyde, 4-methylmercapto-benzaldehyde, 4-methylsulfonylbenzaldehyde, cinnamaldehyde, phenylacetaldehyde, acetone, methylethyl ketone, diethyl ketone, dichloroacetone, acetophenone, cyclohexanone, furfural, tribromacetaldehyde, 4-cyanobenzaldehyde, 4-dimethylaminobenzaldehyde, thiophen-(2)-aldehyde, pyridin-(4)-aldehyde, and the like.

The solvent, which term includes mere diluents, may be a non-polar or a polar organic solvent. Examples include aliphatic and aromatic hydrocarbons, such as hexane and benzene; ethers, such as diethyl ether, dioxan and tetrahydrofuran; and halogenated hydrocarbons, such as dichloromethane and tetrachloromethane.

The reaction according to the invention is carried out in the presence of a tertiary amine, such as trimethylamine, triethylamine or pyridine, preferably triethylamine.

The reaction temperatures are variable within a fairly wide range; in general, the work is carried out at temperatures from substantially between about —20° to +80° C., preferably between about 0° to 40° C.

When carrying out the process according to the invention, the dicarboxylic acid halide and the carbonyl component in the presence of the calculated amount of the tertiary amine are generally used in a molar ratio of 1:1 to 1:4, preferably in a molar ratio of 1:2. The amine, as such or dissolved in one of the above-mentioned solvents, may be added dropwise, with stirring, to the solution of the dicarboxylic acid halide and the carbonyl component, and, optionally, the reaction mixture may be cooled. When working up, filtration from the separated ammonium salt may be first effected, and the filtrate may be concentrated or evaporated in a vacuum at bath temperatures of about 20° to 80° C., preferably at about 20° to 30° C., and the product remaining behind may be purified according to the usual methods.

Some of the compounds obtainable according to the process of the invention are known (cf. in this connection Chemische Berichte, volume 98, pp. 2099–2102 (1965)). The compounds can be used as intermediates; for example, by reaction with aniline or an aniline derivative, compounds can be prepared which possess a fungicidal effectiveness against phytopathogenic fungi.

The following examples illustrate without limitation the process according to the invention; the compounds obtainable according to Examples 1 to 3 and 5 to 10 and 13 to 16 are new.

EXAMPLE 1

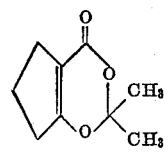

(1)

A solution of 80.8 g. (0.8 mole) triethylamine in 50 ml. of ether is added dropwise, with stirring, to a solution of 73.2 g. of (0.4 mole) adipic acid dichloride and 69.6 g. (1.2 moles) acetone in 700 ml. of dry ether, at such a speed that the reaction mixture only just boils. After completion of the amine addition, stirring is continued for a further hour at room temperature, suction filtration from the triethylammonium chloride is effected, followed by washing twice with 50 ml. of dry ether, and the filtrate is evaporated in a vacuum at a bath temperature of 20 to 30° C. The residue is taken up in about 100 ml. of ether, a small amount of activated charcoal is added, and it is heated to the boil and filtered. From the filtrate there are obtained, by cooling to —40 to —50° C., 48.3 g. of 2,2-dimethyl-4,5,6,7-tetrahydrocyclopenta-1,3-dioxinone-(4) in the form of colorless crystals having a melting point of 36 to 38° C.

Yield: 71.5% of the theory.

EXAMPLE 2

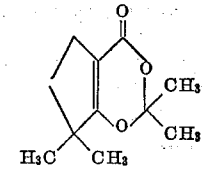

(2)

40.4 g. (0.4 mole) of triethylamine are added dropwise within 45 minutes to a solution of 42.4 g. (0.2 mole) of 2,2-dimethyladipic acid dichloride and 34.8 g. (0.6 mole) of acetone in 600 ml. of ether. After suction filtration of the amine hydrochloride, the solvent is drawn off in a vacuum and the residue is recrystallized from ether. 33.5 g. of 2,2,7,7 - tetramethyl - 4,5,6,7-tetrahydrocyclopenta-1,3-dioxinone-(4) having a melting point of 64 to 65° C. are obtained.

Yield: 85.4% of the theory.

In corresponding manner, there are prepared:

| Example | Formula | Physical properties (M.P., °C.) | Yield (percent of theory) |
|---|---|---|---|
| (3) | 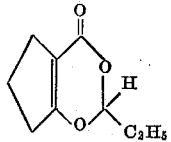 | (¹) | 88.5 |
| (4) | 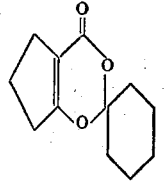 | 32–35 | 71.2 |
| (5) | 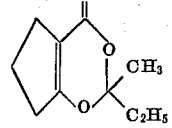 | (²) | 51.5 |
| (6) | 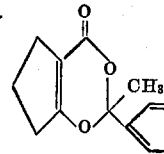 | 93–95 | 8.4 |
| (7) | 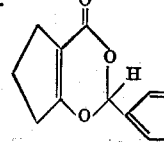 | 97 | 71.3 |

See footnotes at end of table.

TABLE—Continued

| Example | Formula | Physical properties (M.P., °C.) | Yield (percent of theory) |
|---|---|---|---|
| (8) | [structure with p-CH₃ phenyl] | 87–88 | 59 |
| (9) | [structure with o-CH₃ phenyl] | 101–103 | 61.5 |
| (10) | [structure with p-OCH₃ phenyl] | 92–93 | 71.5 |
| (11) | [structure with o-Cl phenyl] | 109–111 | 40 |
| (12) | [structure with p-Cl phenyl] | 104–105 | 65 |
| (13) | [structure with gem-dimethyl, phenyl] | 85–86 | 56 |
| (14) | [structure with gem-dimethyl, phenyl, CH₃] | 71–73 | 60 |
| (15) | [structure with furyl] | 105–107 | 54 |
| (16) | [structure with CH=CH-phenyl] | 115–118 | 53.5 |
| (17) | [structure with p-NO₂ phenyl] | 129–130 | 64.8 |

TABLE—Continued

| Example | Formula | Physical properties (M.P., °C.) | Yield (percent of theory) |
|---|---|---|---|
| (18) | [structure with CCl₃] | 134–136 | 56 |
| (19) | [structure with CBr₃] | 153–155 | 20.5 |
| (20) | [2,2-dimethyl, 4,4-dimethyl, CH₃, CH₃ structure] | (³) | 85 |
| (21) | [structure with pyridyl] | 106–107 | 45 |

[1] IR spectrum: absorption at 1,735 and 1,635 cm.⁻¹.
[2] IR spectrum: absorption at 1,720 and 1,640 cm.⁻¹.
[3] IR spectrum: absorption at 1,740 and 1,635 cm.⁻¹.

Secondary products and examples of use

By heating to 140° C. the 2,2-dimethyl-4,5,6,7-tetrahydrocyclopenta-1,3-dioxinone-(4) of Example 1 and an equimolar amount of an appropriate aniline derivative in xylene as solvent, there are obtained for example the compounds listed in the following table, which are fungicidally effective against *Phytophthora infestans* on tomatoes.

The table contains compounds obtained from intermediate products prepared according to the invention and shows their fungicidal activity compared to that of zinc ethylene-bis-dithiocarbamate, which has been known as fungicidally active and which is in wide-spread commercial use. The symbols denote —=activity weaker than comparative preparation,
==activity the same as the comparative preparation,
+=activity better than comparative preparation.

TABLE 1

[Examples of use, *Phytophthora infestans*/tomatoes]

| Compound | M.P. (° C.) | Fungicidal effectiveness |
|---|---|---|
| (22) [cyclopentanone-CO-NH-(2-Cl,5-CF₃)phenyl] | 78–80 | = |
| (23) [cyclopentanone-CO-NH-(4-Cl,3-CF₃)phenyl] | 68–69 | = |
| (24) [cyclopentanone-CO-NH-(3-CF₃,4-CF₃)phenyl] | 113–115 | = |

What is claimed is:

1. The process for the production of a 4,5,6,7-tetrahydrocyclopenta-1,3-dioxinone-(4) which comprises reacting an adipic acid dihalide having two hydrogen atoms on one α-carbon atom with from about 1 to 4 times the molar amount of an aldehyde or ketone in an inert organic solvent at a temperature of about −20 to 80° C. in the presence of a tertiary amine as acid binder, the adipic acid dihalide having the formula

(II)

the aldehyde or the ketone having the formula

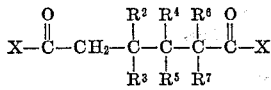
(III)

and the 4,5,6,7-tetrahydrocyclopenta-1,3-dioxinones-(4)- having the formula

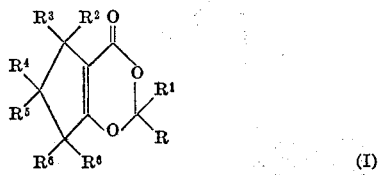
(I)

wherein
R and R¹ jointly stand for pentamethylene, or independently stand for alkyl, haloalkyl or alkenyl with up to 4 carbon atoms, phenylmethyl, phenylethyl, phenyl optionally substituted by methyl, isopropyl, methoxy, ethoxy, methylmercapto, methylsulfoxy, methylsufonyl, nitro, fluorine or chlorine, or for furyl; and $R^2$ to $R^7$ independently stand for hydrogen or alkyl with 1 to 3 carbon atoms.

2. A process according to claim 1 in which the reaction is carried out between 0 and 40° C.

3. A process according to claim 1, in which the molar ratio is about 1:2.

4. A process according to claim 1 in which the amine is triethylamine.

5. A process according to claim 1 in which the amine is added dropwise, with stirring, to a solution of the dicarboxylic acid dihalide and the aldehyde or ketone.

6. A 4,5,6,7 - tetrahydrocyclopenta - 1,3-dioxinone-(4) having the formula

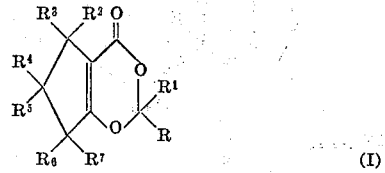
(I)

in which
R and R¹ independently stand for hydrogen, lower alkyl optionally substituted by aryl, lower alkenyl optionally substituted by aryl, phenyl optionally substituted by lower alkoxy, or furyl, and
$R^2$ to $R^7$ independently stand for hydrogen or alkyl with up to 6 carbon atoms.

7. A compound according to claim 6 in which $R^2$ to $R^7$ each stands for hydrogen.

References Cited

Chemical Abstracts, vol. 44, cols. 6817 to 6818, 1950 (abstract of Euler et al.).

Stetter et al., Chem. Ber., vol. 98, pp. 2099 to 2102 (1965).

JOHN D. RANDOLPH, Primary Examiner

U.S. Cl. X.R.

424—324; 260—297 T, 332.3, 340.7